2,846,322

BACTERICIDAL DENTAL CEMENTS

Maxwell Buchalter Colton, New York, N. Y., assignor, by direct and mesne assignments, to Edgar Schaefer, Monmouth County, N. J.

No Drawing. Application April 29, 1952
Serial No. 285,092

1 Claim. (Cl. 106—35)

The present invention relates to new and useful dental cement compositions having bactericidal properties and, more particularly, to a dental cement with which at least one antibiotic has been combined, the bactericidal effects produced being demonstrably greater than that solely attributable to the presence of the antibiotic.

Much investigational work has been done in connection with dental cements and the ancillary problem of sterilizing dentin and cavities prepared for fillings and restorations. It is generally agreed that bacteria invade the dentin beyond the area of decay and the presence of organisms has been shown in dentin even where no demonstrable break in the enamel is present. It has specifically been found that bacteria are present below the floor of the cavity in some 84% of medium-sized preparations and in 93% of deep cavities studied. Various modes of sterilizing the invaded dentin prior to inserting restorations have given negative or doubtful results. The usual practice is to swab the cavity with phenol and alcohol but this has been shown to be one of the least effective methods of sterilization. It has been found that phenol requires forty-five minutes to penetrate one millimeter of dentin and in one study which was carried out on thirty sterilizing agents phenol was placed twenty-ninth on the list. In another investigation of various commonly used sterilizing agents, it was found that Morson's kreosote was the best in that it was reasonably effective in 86% of cases, whereas another commonly used agent—viz., silver nitrate—was found to be effective in only 28% of the tested cases. In connection with silver nitrate, it has been shown that a saturated aqueous solution sterilized dentin to a depth of only 0.3 mm. in 1 minute, 0.7 mm. in 3 minutes, and 1.3 mm. in 10 minutes, thus illustrating the relative ineffectiveness and slow action of this agent. After sterilizations in accordance with customary practices it was demonstrated that live bacteria can be recovered from the dentin even after one year from the sealing of the cavity with a restoration. Thus, in accordance with the present state of development of sterilizing techniques in existing dental practices, it is clear that sterilization is questionable or relatively ineffective.

There is some evidence that the sealing of a cavity by a restoration has some effect in reducing the progress of the carious process and that the bacteria have a tendency to become dormant or de-activated. This may possibly be due to the elimination of moisture necessary to the enzyme action of the bacteria but seepage on saliva is believed to re-activate such dormant or de-activated organisms as well as to reinoculate the dentin. It has been observed that pulpitis and death of the pulp may occur years after filling but whether this is attributable to re-activation of dormant bacteria or to some effect of their toxins is at present unknown. There is, moreover, some inconclusive evidence available to the effect that some dental cements have a limited bacteriostatic effect or even a slight bactericidal effect but this is believed to be conjectural and in any event of insufficient amount to have definite use which can be relied upon.

It is, therefore, one of the objects of the present invention to provide for the first time dental cements which have definite bactericidal properties and which effect adequate sterilization of cavities and dentin regardless of the use of preliminary sterilization techniques as now known.

Another object of the invention is to combine one or more of the antibiotics aureomycin, bacitracin, chloromycetin and streptomycin with dental cements by forming a powdered admixture of the dental cement and at least one such antibiotic and utilizing this admixture for fillings and restorations in accordance with usual practices in dentistry.

A further object of the invention resides in the production of a bactericidal dental cement such as a zinc cement or a silicate cement into which has been incorporated a relatively small amount of at least one antibiotic, whereby a bactericidal effect is produced far in excess of that which could be expected from the use of the specified amount of antibiotic and without detrimental effect on the cement itself.

More specifically, an object of the invention is to incorporate a total of not more than about 40 mg. of one or more of the antibiotics selected from the group consisting of aureomycin, bacitracin, chloromycetin and streptomycin to each 5 gr. of dental cement, thereby making it possible by filling a cavity therewith to effect a relatively permanent and effective cavity and dentin sterilization which not only inhibits the growth and multiplication of bacteria but which contributes markedly to the maintaining of the tooth structure in healthy condition with little or no tendency for the resumption of the carious process.

Other and further objects and advantages will be understood and appreciated by those versed in this art or will be apparent or pointed out hereinafter.

My present invention is predicated upon the discovery that dental cements and restorations used for filling cavities have little or no bacteriostatic or bactericidal properties and that effective bactericidal and sterilizing properties can be imparted thereto by incorporating therein a relatively small amount of one or more of the antibiotics aureomycin, bacitracin, chloromycetin and streptomycin. By admixing the dental cements or restoration materials in powdered form with small amounts of one or more of the aforesaid antibiotics in powdered form, a composite or combination cement or restoration material is produced which not only has effective bactericidal power and prolonged sterilizing properties but which manifests that power to an extent far beyond the amount of the antibiotic(s) added. While I do not at this time know the precise explanation or mechanism involved in the enhancing of the action of the small quantity of antibiotic by the dental cement, I am presently of the opinion that this is at least partially attributable to the presence of phosphorus compounds or radicals such as phosphoric acid or an alkaline earth phosphate but whatever the modus operandi involved it has been conclusively shown not only that the antibiotic-fortified cement has strong bactericidal activity and sterilizing action but also that the bactericidal activity is actually greatly in excess of that resulting from the use of the relatively small amount of antibiotic involved.

In accordance with the preferred manner of carrying out the invention, 40 mg. of antibiotic are incorporated and thoroughly admixed with each 5 gr. of dental cement, both components being in powdered form. The 40 mg.

of antibiotic may in accordance with one form of the invention be entirely composed of aureomycin, bacitracin, chloromycetin or streptomycin but in another form of the invention a total of 40 mg. of all four antibiotics is employed, the 40 mg. being equally or unequally divided among the individual antibiotics and thus one of the particular phases of my invention comprises dental cements fortified with multiple antibiotics. Such dental filling cement fortified with the multiple antibiotics has been found to be bactericidally active against organisms of both the gram-positive and gram-negative groups. To some extent the choice of antibiotics depends upon the organisms likely to be present since it is known that certain antibiotics have an antibiotic spectrum which is particularly effective for certain types of organisms. In selecting the antibiotics for the multiple antibiotic dental filling cement, one is chosen that is active against pathogenic organisms of the gram-positive group and another is chosen that is bactericidally active against organisms of the gram-negative group. I am not, however, limited to the use of a total antibiotic content of 40 mg. per 5 gr. of dental cement since in some cases I have found that adequate and effective results can be produced with 20 mg. of antibiotic(s) and this may in certain instances be as low as 10 mg. and, consequently, the invention embraces the use of approximately 10 to 40 mg. of total antibiotic content for each 5 gr. of dental cement. On a weight percentage basis, the antibiotic constitutes 0.2–0.8% based on the weight of the dental cement.

The following series of experiments were carried out to demonstrate the present invention and to make comparisons with unfortified cements and restoration materials and with various filling cements and compositions and these are set forth below in illustrative but not limitative manner in the following table:

Table 1

| Test Material | Zone of Inhibition, Approximate Diameter, mm. | Culture from Zone of Inhibition |
| --- | --- | --- |
| (1) Zinc cement (Fleck's) | 6.0 | Growth Obtained. |
| (2) Argenite (Fleck's) | 22.0 | Do. |
| (3) Red Copper (Fleck's) | 12.0 | Do. |
| (4) Terracin (Caulk) | 10.5 | Do. |
| (5) Zinc cement (S. S. White) | 8.0 | Do. |
| (6) Zinc cement (Stratford-Cookson). | 8.0 | Do. |
| (7) Di-Cem (Caulk) | 14.0 | Do. |
| (8) Zinc Silicate (S. S. White) | 13.0 | Do. |
| (9) Petralit (Premier) | 16.0 | Do. |
| (10) Synthetic Porcelain (De Trey's) | 10.5 | Do. |
| (11) Kadon (Caulk) | 0. | Do. |
| (12) Silver amalgam | 12.5 | Do. |
| *Zinc Cement Fortified With—* | | |
| (13) Aureomycin 10 mg./5 gr | 28.5 | Do. |
| (14) Bacitracin 10 mg./5 gr | 19.0 | Do. |
| (15) Chloromycetin 10 mg./5 gr | 25.0 | Do. |
| (16) Streptomycin 10 mg./5 gr | 32.0 | Do. |
| (17) Aureomycin 20 mg./5 gr | ¹32.5 | Do. |
| (18) Bacitracin 20 mg./5 gr | 23.0 | Do. |
| (19) Chloromycetin 20 mg./5 gr | 27.0 | Do. |
| (20) Streptomycin 20 mg./5 gr | 32.0 | Do. |
| (21) Aureomycin 40 mg./5 gr | 34.5 | No Growths Obtained. |
| (22) Bacitracin 40 mg./5 gr | 30.0 | Do. |
| (23) Chloromycetin 40 mg./5 gr | 34.5 | Do. |
| (24) Streptomycin 40 mg./5 gr | 34.0 | Do. |
| *Dia-Discs of—* | | |
| (25) Aureomycin | 32.5 | Do. |
| (26) Bacitracin | 30.5 | Do. |
| (27) Chloromycetin | 26.5 | Do. |
| (28) Streptomycin | 31.0 | Do. |

¹ Mold—probably due to contamination.

Referring to the foregoing table, pellets of identical diameter were made using standard zinc cements, silicate cements, self-curing resin and silver amalgam and, in addition, standard zinc cement fortified with varying contents of aureomycin, bacitracin, chloromycetin and streptomycin. These pellets were placed on dextrose agar pour plates carrying uniform mixed organisms commonly found in dental caries. "Dia-discs" of aureomycin, bacitracin, chloromycetin and streptomycin were used as controls. After incubation for 48 hours the results set forth in the table were noted. In every instance (except with the resinous plastic) a zone of inhibition was obtained around the implant. These zones varied from 0 in the case of the resinous plastic to 6 mm. in diameter in zinc cement #1 to 34.5 mm. in diameter for zinc cement reinforced with 40 mg. of aureomycin per 5 gr. of zinc cement. Smears were taken from the zones of inhibited growth and cultured. Growths were obtained in specimens #1 through #20 indicating a partial bactericidal effect but no growths were obtained in specimens #21 through #28 indicating complete bactericidal action. The only exception was specimen #11, the resinous plastic, which had no zone of inhibition and which was not expected to have any. After refrigeration for one week the same pellets were placed on the surface of fresh plates and still showed zones of inhibition although to a somewhat lesser extent.

The same experiment was repeated in accordance with the following using both pellets and "wet" materials:

Table II

Zinc cement (pellet)
Zinc cement, "wet" (inlay cementation consistency)
Zinc cement with aureomycin—10 mg./5 gr. ("wet")
Zinc cement with aureomycin—20 mg./5 gr. ("wet")
Zinc cement with aureomycin—40 mg./5 gr. ("wet")
Silicate cement pellet
Silicate cement, "wet"
Silicate cement fortified with aureomycin—40 mg./5 gr. "wet"
Resinous plastic ("wet")
Resinous plastic fortified with aureomycin—40 mg./5 gr. "wet"

It was noted from the tests of Table II that in every instance a larger zone of inhibition was observed around the zinc and silicate cements implanted in the "wet" state as compared to the dry pellet. Addition of the antibiotic markedly increased the zone of inhibition but, due to the irregularity of form of the "wet" implants, measurements of the zones of inhibition were not made as they would have no precise meaning. Again, the resinous plastic showed no area of inhibition but, when antibiotic was added thereto, a bactericidal zone of appreciable size was produced.

In order to compare the effect of multiple antibiotics as against the use of a single antibiotic, a further test was carried out using unfortified cement, cement fortified with 20 mg. of aureomycin per 5 gr. of cement and cement fortified with multiple antibiotics—viz., aureomycin, bacitracin, chloromycetin and streptomycin—in the total amount of 20 mg. per 5 gr. of cement. A "Dia-disc" of aureomycin was used as the control. The results of this test demonstrated that the unfortified cement showed no zone of inhibition but both cements fortified with antibiotics showed marked zones of inhibition of approximately equal diameter. It is interesting and pertinent to note that the "Dia-disc" of aureomycin showed a zone of only partial inhibition, some organisms growing up to the implant. Both fortified cements apparently inhibited all growth. Cultures made from smears, however, showed that the cement with aureomycin was only partially effective, growths being obtained. The cement fortified with multiple antibiotics proved to be completely bactericidal, no growths being obtained.

From the foregoing it was concluded that some factor in the cement, possibly the phosphoric acid in conjunction with the antibiotic agent(s), increased and enhanced the bactericidal action of the antibiotic(s). To determine this more definitely, the following test was set up wherein the test material was placed on uniform agar pour plates:

*Table III*

| Test Material | Zone of Inhibition, mm. |
|---|---|
| (1) Zinc cement fortified with aureomycin 20 mg./5 gr. ("wet") | 29 |
| (2) Zinc cement fortified with multiple antibiotics (aureomycin, bacitracin, chloromycetin and streptomycin), "wet" | 29 |
| (3) Aureomycin "Dia-disc" | 18 |
| (4) Aureomycin "Dia-disc" ("wet" with drop of water) | 17 |
| (5) Aureomycin "Dia-disc" ("wet" with drop of cement liquid) | 22.5 |
| (6) Aureomycin "Dia-disc" | 18 |
| (7) Aureomycin "Dia-disc" ("wet" with cement liquid diluted with water) | 21 |
| (8) Zinc cement powder (dry) | 0 |
| (9) Zinc cement powder ("wet" with drop of water) | 0 |
| (10) Zinc cement powder ("wet" with cement liquid, (unmixed)) | 20 |
| (11) Zinc cement fortified with aureomycin, 20 mg./5 gr., (dry powder) | 20.5 |
| (12) Zinc cement fortified with aureomycin 20 mg./5 gr. with drop of water | 22 |
| (13) Zinc cement fortified with aureomycin 20 mg./5 gr. with drop of cement liquid | 31 |
| (14) Drop of cement liquid (spread 17 mm on plate) | 31 |

Cultures made from smears taken from the zones of inhibition around test materials #1, 2, 3, 11 and 14 of the above series showed the following results:

*Table IV*

(1) Zinc cement fortified with aureomycin, 20 mg./5 gr. ("wet" mix) _____ No growths.
(2) Zinc cement fortified with multiple antibiotics, 20 mg./5 gr. ("wet" mix) _____ No growths.
(3) Aureomycin "Dia-disc" _____ Growth obtained.
(11) Zinc cement fortified with aureomycin, 20 mg./5 gr. (dry powder) _____ Growth obtained.
(14) Cement liquid _____ No growth obtained.

These results clearly indicate that the liquid fraction of the cement is the factor which augments and enhances the action of the antibiotic(s) and that the use of dental cements or restoration materials fortified with multiple antibiotics produces excellent results.

Thus the combination of the multiple antibiotics with the cements results in highly effective bactericidal action such as is not obtainable separately either from the cements themselves in the powdered, "wet" or set states or from the antibiotics themselves. Consequently, by incorporating the antibiotics into dental cements effective bactericidal and sterilizing action is produced over a prolonged period of time without adversely affecting the cement itself since it has been found that these small additions of antibiotics do not exert any observable or appreciable adverse effect upon the setting or adhesive qualities of such cements.

The foregoing is presented as illustrative not as restrictive or limitative since within the terms of the appended claim various modifications may be made without departing from the invention.

I claim:

A bactericidal dental filling cement consisting essentially of an intimate admixture of a zinc cement set with phosphoric acid, and a multiple antibiotic consisting of aureomycin, bacitracin, chloromycetin and streptomycin, the quantity of antibotic being about ten to forty milligrams to each five grams cement.

References Cited in the file of this patent
UNITED STATES PATENTS

| | | |
|---|---|---|
| 1,244,296 | Crowell | Oct. 23, 1917 |
| 1,245,879 | Crowell | Nov. 6, 1917 |
| 1,310,901 | Andresen | July 22, 1919 |
| 1,792,200 | Thomsen | Feb. 10, 1931 |
| 2,347,567 | Kresse | Apr. 25, 1944 |
| 2,482,055 | Duggar | Sept. 13, 1949 |

OTHER REFERENCES

Kutscher, Austin H.: Squibb Abstract Bulletin, vol. 23, page A1551, Dec. 6, 1950.